Sept. 15, 1959     C. F. BERTSCHINGER     2,904,206
DRAFTING INSTRUMENT
Filed June 23, 1958     2 Sheets-Sheet 1
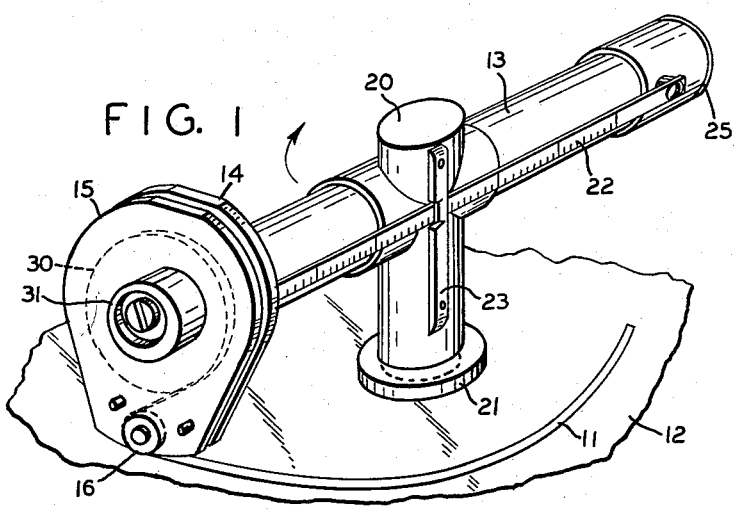
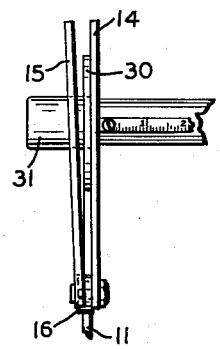
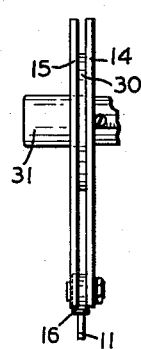
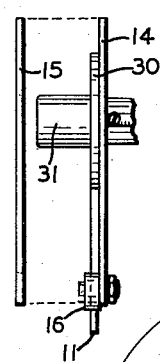
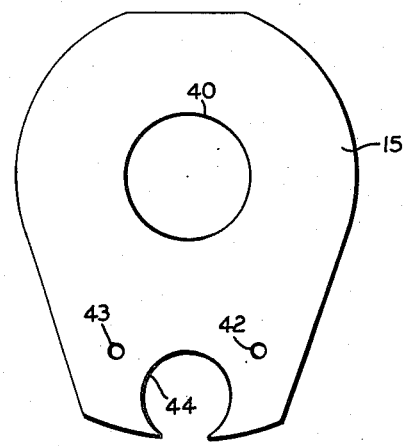
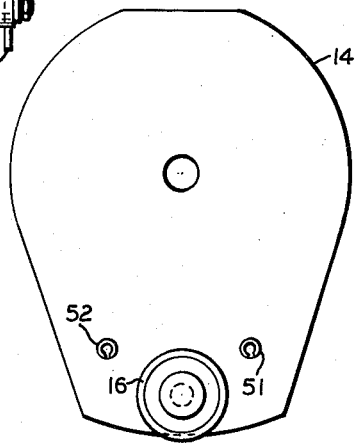
INVENTOR.
CHARLES F. BERTSCHINGER
BY Ervin B. Steinberg
AGENT.

Sept. 15, 1959 C. F. BERTSCHINGER 2,904,206
DRAFTING INSTRUMENT
Filed June 23, 1958 2 Sheets-Sheet 2

INVENTOR.
CHARLES F. BERTSCHINGER
BY
Ervin B. Steinberg
AGENT.

United States Patent Office 2,904,206
Patented Sept. 15, 1959

2,904,206

DRAFTING INSTRUMENT

Charles F. Bertschinger, Leeds, Mass., assignor to Chart-Pak, Incorporated, Leeds, Mass., a corporation of Connecticut Application June 23, 1958, Serial No. 743,725

5 Claims. (Cl. 216—20)

This invention refers generally to drafting instruments and more particularly has reference to an instrument for applying comparatively narrow pressure sensitive tape in a circular pattern to a flat surface. The instrument will be found helpful in preparing for instance, drawings and masters for printed circuits or for creating statistical graphs and charts.

Printed circuits are used widely for electronic circuits. Such circuits in the form of plates or cards are produced most frequently by etching laminated copper-clad plates in such a manner that lines of conductors, terminal points, etc. remain, while all other copper area is dissolved in an etching bath. The preparation of photographic masters, enlarged to about four times the final size, which show the remaining conductors, tie points, etc. is usually the first step.

Whereas in the past such masters were prepared by the use of india ink on paper, more recent techniques utilize pressure sensitive opaque tape ($\frac{1}{32}$ to $\frac{1}{4}$ inch wide) for the line work. This new method is faster, cleaner and simpler, and requires less skill. Moreover, the medium to which the tape is affixed remains dry and flat, thus maintaining dimensional accuracy, line spacing and line weight.

In connection with the above work, it is required at times to provide substantially circularly arranged conductors or outlines for components. Although certain prior instruments may have been or are adapted for the instant use, most fail to provide the necessary accuracy required.

One of the objects of this invention therefore is the provision of a drafting instrument which avoids one or more of the disadvantages of prior art devices.

Another object of this invention is the provision of an instrument which dispenses and affixes comparatively narrow tape to a surface.

Another object of this invention is the provision of an instrument adapted to affix pressure sensitive tape to surfaces in a circular manner.

Another object of this invention is to provide an instrument which is useful in the preparation of masters for printed electronic circuits.

A further object of this invention is the provision of an instrument which affixes tape to a surface in a highly precise and accurate manner.

A further and other object of this invention is to provide an instrument for applying tape which may be used by relatively unskilled and inexperienced personnel, yet obtaining satisfactory results.

A still further and other object of this invention is the provision of an instrument for affixing tape in a circular pattern, whereby the radius of the circle is adjustable.

Still other and further objects of the invention will be apparent from the following description taken in conjunction with the accompanying drawings, in which:

Figure 1 is a perspective view of the drafting instrument as used when applying tape in a circular pattern to a surface;

Figure 2 is a close-up view at certain portions of the tape dispensing mechanism;

Figure 3 is a close-up view, same as Figure 2, when the outer plate of the tape dispensing mechanism is released for removal of the roll of tape;

Figure 4 is a partially exploded view of the arrangement depicted in Figures 2 and 3;

Figure 5 is a plan view at the inner side plate;

Figure 6 is a plan view at the outer side plate, and

Figure 7:
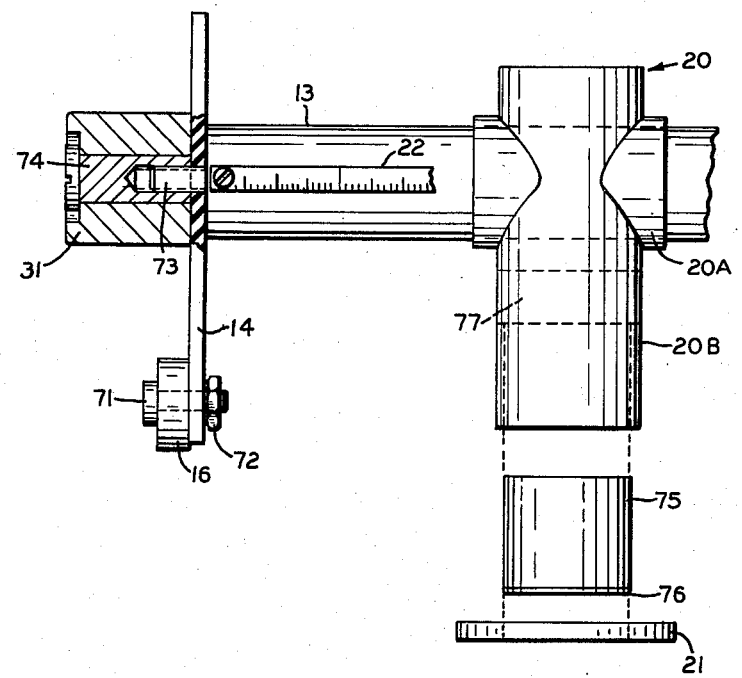
Figure 7 is a side elevational view, partly in section, to reveal certain portions and parts of the drafting instrument.

Referring now to the figures and Figure 1 in particular, the drafting instrument is shown in its operating position affixing pressure sensitive tape 11 onto a surface 12. It will be understood that such tape may be comparatively narrow tape, $\frac{1}{32}$ to $\frac{1}{4}$ inch wide, imprinted with various markins or being opaque, and that the tape may embody pressure sensitive material at its underside so that when this side is brought into contact with surface 12, the tape will adhere thereto. Surface 12 may be tracing paper, bristol board or any other suitable material which for instance may be used as a photographic master, as a statistical chart, or similar graphic display.

The instrument comprises as its main portions an elongated bar 13 supporting at its left end a tape dispensing mechanism which includes, an inner side plate 14, an outer side plate 15, both retaining a roll of tape therebetween from which tape is dispensed by being fed about roller 16, the roller serving simultaneously to press the tape against surface 12.

A slide 20, adjustably positionable along the bar supports the instrument on the surface 12. The vertical axis through the slide becomes the center of the "tape circle." The slide engages at its lower end a rotatable extension (shown more clearly in Figure 7) which remains stationary with respect to surface 12 so that the bar 13 may be rotated about the desired angle without encountering lateral displacement.

An annular ring with cross hair index aids to position the instrument at the center of the desired circle.

The slide 20 is retained frictionally on the bar and its displacement from the left end (radius of circle) is indicated on scale 22, mounted to bar 13. The scale is read in conjunction with indexing guide 23 affixed to the slide. Stop 25 limits the motion of the slide toward the right end.

Rotation of the slide about the longitudinal axis of bar 13 is prevented by a longitudinal slot at the underside of the bar (not visible) and a tooth attached to the slide which rides within the slot.

Figures 2, 3 and 4 show more clearly the tape holding and dispensing mechanism. Side plates 14 and 15 confine a roll of tape 30 therebetween. Plate 14 is attached to bar 13, while plate 15 is designed with a central aperture to slide over bushing 31. This bushing is mounted slightly eccentric with respect to aperture 40 in plate 15, the aperture being only slightly larger than the bushing. Inner plate 14 is provided with a set of split tubular pins 51 and 52 which protrude outwardly from the face of the plate so as to engage two corresponding apertures 42 and 43 in plate 15.

Aperture 44 on plate 15 is shaped so that it encircles almost completely the periphery of roller 16, yet permits the roller to turn freely. Roller 16, for instance a ball bearing, is positioned in such a manner that its lowest portion extends beyond the lower edge of plates 15 and 16 thereby becoming useful for pressing the tape onto the surface.

The tape retaining mechanism operates as follows: With the mechanism dissassembled, first the roll of tape 30 is moved over bushing 31 and rested against inner plate 14. Tape is fed with its non-tacky side about the periphery of roller 16. Next, the outer plate is moved slidingly onto bushing 31 toward the right causing pins 51 and 52 to engage corresponding apertures 42 and 43 respectively. Finally, bushing 31 is turned and as the bushing is mounted eccentrically, side plate 15 tightens against pins 51 and 52, and assumes the inclined position depicted in Figure 2.

This particular mounting is a very desirable one since there is no longer any frictional pressure against the side of the roll of tape which might cause the tape to tear as it is unwound from the roll and affixed to the surface. Yet, at the lower end, where the tape is dispensed to the surface, the tape is accurately confined within a predetermined space which remains fixed relative to the position of scale 22 affixed to bar 13.

Figure 7 shows some of the other portions of the instrument. Roller 16 is mounted to plate 14 by means of a screw 71 and nut 72. Plate 14, shown as being made of plastic material, is fastened to bar 13 using a screw 73 and internally threaded screw bushing 74. The head of bushing 74 serves also to retain bushing 31 which supports the roll of tape.

Slide 20 (shown as comprising a horizontal piece of tubing 20A and a horizontally apertured, vertical piece of tubing 20B) is adapted to receive a short bar 75 which is free to slide vertically or to rotate within tubing 20B, having, however, only a small amount of play. At the lower end of bar 75 there is disposed a replaceable piece of pressure sensitive material 76 which engages the surface 12 to fix the location of the instrument thereupon. Cross hair index ring 21 fits over bar 75 and is free to turn thereabout.

A plug 77 inserted in tubing 20B restricts vertical motion of bar 75.

The use of the foregoing instrument may be visualized as follows: First, the slide is positioned along the bar to the desired radius index mark. Next, bar 75 is placed on the center of the circle using index ring 21 as a guide, and pressed onto the surface. Then, slide 20 is slipped over bar 75 and roller 16 is brought into contact with the surface 12. Finally, the bar is rotated about the center axis of slide 20 causing the tape to become affixed to the surface in a circular pattern.

It will be apparent to those skilled in the art that various modifications may be made without deviating from the principle described. For instance, slide 20 may be made as a single piece. Moreover, slide 20 and bar 75 may form a single, unitary device. Still further, instead of pressure sensitive material 76 and bar 75, the slide at its lower end may be equipped with a sharp point which will puncture the supporting surface as is found on standard drafting type compass. Alternately, the lower end of the bar may be furnished with a magnetic material so as to adhere to a magnetic supporting or backing surface thereby taking advantage of magnetic adhesion. Both, pressure sensitive material and magnetic adhesion provisions have the advantage that the surface to which tape is affixed does not become damaged.

While there have been described and illustrated certain embodiments of the present invention, it will be apparent to those skilled in the art that several other and further changes and modifications may be made without deviating from the broad principle, spirit and intent of the invention which should be limited only by the scope of the appended claims.

What is claimed is:

1. A drafting instrument of the type described comprising: an elongated bar; one end of said bar supporting a tape dispensing mechanism; said mechanism including a first side plate, a rotatable eccentric bushing extending outwardly from said plate, and a second side plate equipped with a substantially centrally located aperture adapted to slidably fit over said bushing; a set of pins extending outwardly from one of said plates and mating with corresponding apertures in the other side plate and said pins and apertures securing said plates to one another when the eccentric bushing is rotated causing it to exert pressure against the wall of said substantially centrally located aperture.

2. A drafting instrument of the type described comprising: an elongated bar; one end of said bar supporting a roll of tape whose center of rotation is substantially parallel to the longitudinal axis of said bar; a pair of side plates disposed to confine therebetween said roll of tape; one of said plates supported on said bar; an eccentric bushing extending outwardly from said one plate and said bar thereby acting as spindle for said roll of tape; the other side plate having an aperture which snugly fits over said bushing; a set of pins extending outwardly from one of said side plates and mating with corresponding apertures in the other side plate whereby said pins and mating apertures in the other side plate whereby said pins and mating apertures retain said plates to one another when said eccentric bushing is turned to cause a locking pressure between the apertures and pins; a roller disposed between said side plates about which the tape is fed when it is unwound from said roll and said roller positioned relative to said plates to press the tape along its entire width onto the surface to which the tape is affixed; said bar supporting also a slide which is adapted to be positioned at a desired distance from said roll of tape and side plates respectively; said slide incorporating a rotatable element which is provided with means to rest on the surface to which the tape is affixed whereby the bar when rotated about said element causes said roller to describe a circular path for affixing tape in a circular pattern to the surface.

3. A drafting instrument of the type described comprising: an elongated bar; one end of said bar supporting a roll of tape; a pair of side plates disposed to confine therebetween said roll of tape; one of said plates supported on said bar; an eccentric bushing extending outwardly from said one plate and said bar thereby acting as spindle for said roll of tape; the other side plate having an aperture which snugly fits over said bushing; a set of pins extending outwardly from one of said side plates and mating with corresponding apertures in the other side plate whereby said pins and mating apertures retain said plates to one another when said eccentric bushing is turned to cause a locking pressure between the apertures and pins; a roller disposed between said side plates about which the tape is fed when it is unwound from said roll and said roller positioned relative to said plates to press the tape along its entire width onto the surface to which the tape is affixed; said bar supporting also a slide which is adapted to be positioned at a desired distance from said roll of tape and side plates respectively, and indicia means disposed along the bar to indicate the position of the slide relative to the tape.

4. A drafting instrument of the type described comprising: an elongated bar; one end of said bar supporting a roll of tape; a pair of side plates disposed to confine therebetween said roll of tape; one of said plates supported on said bar; an eccentric bushing extending outwardly from said one plate and said bar thereby acting as spindle for said roll of tape; the other side plate having an aperture which snugly fits over said bushing; a set of pins extending outwardly from one of said side plates and mating with corresponding apertures in the other side plate whereby said pins and mating apertures retain said plates to one another when said eccentric bushing is turned to cause a locking pressure between the apertures and pins; a roller disposed between said side plates about which the tape is fed when it is unwound from said roll and said roller positioned relative to said plates to press the tape along its entire width onto the surface to which the tape is affixed; said bar supporting also a slide which is adapted to be positioned at a desired distance from said roll of tape and side plates respectively; said slide incorporating a rotatable element which is provided with means to rest on the surface to which the tape is affixed whereby the bar when rotated about said element causes said roller to describe a circular path for affixing tape in a circular pattern to the surface, and annular indexing means engaging said slide for aiding the positioning of the instrument on said surface.

5. A drafting instrument of the type described comprising: an elongated bar; one end of said bar supporting a roll of tape; a pair of side plates disposed to confine therebetween said roll of tape; one of said plates supported on said bar; an eccentric bushing extending outwardly from said one plate and said bar thereby acting as spindle for said roll of tape; the other side plate having an aperture which snugly fits over said bushing; a set of pins extending outwardly from one of said side plates and mating with corresponding apertures in the other side plate whereby said pins and mating apertures retain said plates to one another when said eccentric bushing is turned to cause a locking pressure between the apertures and pins; a roller disposed between said side plates about which the tape is fed when it is unwound from said roll and said roller positioned relative to said plates to press the tape along its entire width onto the surface to which the tape is affixed; said bar supporting also a slide which is adapted to be positioned at a desired distance from said roll of tape and side plates respectively; said slide incorporating a rotatable element which is provided with means to removably adhere to the surface to which the tape is affixed whereby the bar when rotated about said element causes said roller to describe a circular path for affixing tape in a circular pattern to the surface.

References Cited in the file of this patent
UNITED STATES PATENTS

| | | |
|---|---|---|
| 1,008,139 | Hallock | Nov. 7, 1911 |
| 1,125,206 | Strandlund | Jan. 19, 1915 |
| 1,179,706 | Doerr | Apr. 18, 1916 |
| 2,594,457 | Kunzler | Apr. 29, 1952 |
| 2,737,720 | Kaser | Mar. 13, 1956 |
| 2,763,393 | Gill et al. | Sept. 18, 1956 |